(12) United States Patent
Gotoh et al.

(10) Patent No.: US 7,305,852 B2
(45) Date of Patent: Dec. 11, 2007

(54) METHOD FOR MANUFACTURING QUARTZ GLASS INGOT

(75) Inventors: Yoshihiko Gotoh, Sakata (JP); Shinichi Satoh, Yamagata (JP); Masakazu Kudoh, Yamagata (JP)

(73) Assignee: Tosoh Quartz Corporation, Yamagata-shi (JP)

( * ) Notice: Subject to any disclaimer, the term of this patent is extended or adjusted under 35 U.S.C. 154(b) by 295 days.

(21) Appl. No.: 09/863,750

(22) Filed: May 23, 2001

(65) Prior Publication Data

US 2002/0002843 A1    Jan. 10, 2002

(30) Foreign Application Priority Data

May 30, 2000    (JP) ............... 2000-160920

(51) Int. Cl.
*C03B 19/09*    (2006.01)
*C03B 15/18*    (2006.01)

(52) U.S. Cl. ............... 65/17.4; 65/126; 65/144; 65/187

(58) Field of Classification Search ............... 65/17.3, 65/17.4, 126, 144, 187, 325
See application file for complete search history.

(56) References Cited

U.S. PATENT DOCUMENTS

| | | | | |
|---|---|---|---|---|
| 1,960,215 A | * | 5/1934 | Ellis et al. | ............... 65/33.1 |
| 3,303,115 A | * | 2/1967 | Nitsche | ............... 205/687 |
| 4,923,497 A | * | 5/1990 | Leber et al. | ............... 65/86 |
| 5,256,855 A | * | 10/1993 | Heanley et al. | ............... 219/121.59 |
| 5,364,432 A | * | 11/1994 | Leber | ............... 65/17.3 |
| 5,762,672 A | * | 6/1998 | Ikeda et al. | ............... 65/17.3 |
| 6,649,268 B1 | * | 11/2003 | Komine et al. | ............... 428/426 |
| 6,763,682 B1 | * | 7/2004 | Sayce et al. | ............... 65/17.4 |

FOREIGN PATENT DOCUMENTS

| | | | |
|---|---|---|---|
| JP | 04055332 A | * | 2/1992 |
| WO | WO 00/03955 | * | 1/2000 |

* cited by examiner

*Primary Examiner*—Carlos Lopez
(74) *Attorney, Agent, or Firm*—Flynn, Thiel, Boutell & Tanis, P.C.

(57) ABSTRACT

The invention provides a method for manufacturing a large scale quartz glass slab ingot in a flame hydrolysis reaction in a furnace, including the steps of rotating the furnace, depositing a fused silica on a furnace bed, and extending the deposit outwardly by heating and rotation of the furnace, thereby a quartz glass slab ingot is obtained. A quartz glass burner is installed at the ceiling of the furnace, hydrogen gas supplied to the burner flows down along the tapered wall of the oxygen chamber and is ejected into the outer casing. Part of the hydrogen gas is deflected to the center of the burner and mixed with the oxygen just after the ejection from the oxygen gas nozzles. Thereby, the flame is formed smoothly and the thermal efficiency is improved. The flame becomes wide enough and the silica powder transported by the hydrogen gas is uniformly fused by the flame and heat capacity of the fused silica.

5 Claims, 15 Drawing Sheets

METHOD FOR MANUFACTURING QUARTZ GLASS INGOT

BACKGROUND OF THE INVENTION

1. Field of the Invention

The present invention relates to a method for manufacturing a quartz glass ingot, especially for manufacturing a quartz glass slab ingot, and further relates to a method for manufacturing a round bar or a plate quartz glass ingot containing OH, which is useful as a material for semiconductor manufacturing equipment.

Further, the present invention relates to a quartz glass burner installed in a quartz glass manufacturing apparatus.

2. Prior Arts

There are many methods for manufacturing a quartz glass ingot by fusing silica powder, in which the heat is supplied by a flame of hydrogen-oxygen or a flame of propane-oxygen, an arc, or by electric heat. In general, as shown in Japanese patent Sho46-42111 (1971-42111,B2,JP), a quartz glass ingot is manufactured by fusing silica powder, depositing the fused silica on a rotating target, lowering the target gradually at a constant speed, and quenching the fused silica thereby forming a shell-like column ingot on the target. As disclosed in Kokai Hei 04-325425, (1992-325425,JP,A), silica powder is fused by a plasma arc and the fused silica is deposited on a rotating table, then a column quartz glass ingot is formed on the rotating table. Either of the finished quartz glass ingot has a form of a column.

In Kokai Sho 47-41640(1972-41640,A,JP), or in Kokai 52-145422(1977-145422,a,JP), there is disclosed a method of manufacturing a round bar quartz glass directly by fusing silica powder without a secondary heating process of a quartz glass ingot, in which silica powder is introduced into a furnace, fused therein and then fused silica is withdrawn from the bottom of the furnace continuously. The heat source of these methods is an electric heater disposed inside or outside the furnace.

A conventional method of manufacturing a round bar or a rectangular bar by using an oxygen-hydrogen flame as a heat source involves, first manufacturing a quartz glass ingot with an oxygen-hydrogen flame, then drilling a core glass mechanically from the ingot, or as disclosed in Kokai Sho 48-12319(1973-12319,A,JP), a previously formed quartz glass cylinder, which is placed in a case, is heated in an induction furnace or in a Tanman furnace at 2000 degrees centigrade, melted, and withdrawn from a nozzle to obtain a round bar or a rectangular bar. The conventional methods require a secondary process, therefore the process is called a two-step-manufacturing method.

In addition, in the methods of manufacturing a quartz glass by utilizing a flame as a heat source, it is not preferable to use a metal burner, because the metal burner releases a metal vapor or metal oxide which become impurities in the quartz glass.

A propane gas may be used for the flame fusing method of manufacturing quartz glass, but from a view point of the purity of the quartz glass, control of the atmosphere of the furnace or quality of the quartz glass, the oxygen-hydrogen flame manufacturing method is superior to the propane gas method.

DETAILED EXPLANATION OF THE INVENTION

A quartz glass, which is chemically inactive, especially a quartz glass manufactured by fusing silica powder by an oxygen-hydrogen hydrolysis method, is widely used in semiconductor industries because it has a high heat durability compared with a synthesized quartz glass. The sizes of semiconductor wafers become bigger and bigger each year for production of the semiconductor devices, consequently, a larger sized quartz glass ingot is required.

The quartz glass ingot manufactured by the prior arts is mostly a column ingot and the sectional area of the ingot is not large enough for the production of the large sized semiconductor devices.

Also, in the conventional method of manufacturing a quartz glass by fusing silica powder with an electric heater, if the size of the machines become very large, bubbles likely remain in the manufactured quartz glass ingot. Further, the amount of the impurities are much larger than the one manufactured by the oxygen-hydrogen flame method.

Quartz glass used for production of the semiconductor devices is sometimes required to have a high OH content depending on the purpose of the use. But the quartz glass manufactured by the electric heat fusing method contains less OH, merely 10 ppm at a maximum. It is not preferable to dope OH after the production, because the manufacturing process becomes complex.

For solving these problems, it is long hoped to provide a new method utilizing the oxygen-hydrogen flame method which enables the manufacture of quartz glass with a shape of an elongated bar containing about 200 ppm of OH.

In the oxygen-hydrogen flame method, different from the electric heater fusing method in which the electric heater can be disposed around the closed furnace, it is difficult to control the atmosphere of the furnace because the silica powder is directly fused by the oxygen-hydrogen flame and the furnace cannot be closed. The furnace materials and a nozzle for withdrawing the quartz glass are worn out in a short time because the oxygen-hydrogen flame is produced in an atmospheric condition where the atmosphere of the furnace becomes oxidative, consequently it is difficult to operate the furnace continuously for a long period.

Further, with respect to the withdrawing process, the quartz glass product is withdrawn from the nozzle by gravity and is received by a basket, therefore it is also difficult to control the temperature of the furnace and the fused quartz glass is formed into a desired shape after withdrawal from the furnace and being cooled, the shape of the product is limited and the accuracy of the product is not sufficient.

In the conventional burner of the silica furnace, since silica powder is not supplied into the furnace through a center of the burner but through several distributing channels with a carrier gas, for instance hydrogen gas, it is possible to supply a large amount of the silica powder into the furnace and applicable to enlarging the scale of the quartz glass ingot.

For the purpose of producing a further large-scale quartz glass ingot, enlarging a diameter of the outer case of the burner or enlarging the oxygen or hydrogen nozzle diameter is needed to thereby increase the amount of supplied silica powder, oxygen and hydrogen.

But according to the structure of the conventional burner as shown in FIG. 15, the hydrogen gas flows out directly from the periphery of the outer casing toward a focus point (convergence point) which is comparatively a long distance for mixing with an oxygen gas flowing out from the oxygen gas nozzles disposed inside the outer casing.

As the gas mixing range is rather long, both gases disperse and the mixing rate becomes low, consequently, all the gases are not converted to heat energy which leads to a large energy loss. The focus point of the oxygen gas and the hydrogen gas mixture becomes a small area spot on the producing ingot surface, especially in the case if a large scale quartz glass into, therefore making it difficult to prepare a uniform fusion area.

To raise the heat efficiency of the oxygen-hydrogen flame, a spot having comparatively wide area near the outer casing edge is selected. For instance, the spot is 60 mm φ and the quartz glass ingot manufactured by fusing the silica powder with the oxygen-hydrogen flame. But the surface temperature of the ingot does not reach high enough, and the fused spot area becomes double circled and the inside of the ingot turns blackish as a result of deficiency of fusion.

In addition, in the conventional burner, the flow of the silica powder interferes with the flow of the hydrogen gas, and if the diameter of the quartz glass ingot exceeds 400 mm, and a supply rate of the silica powder is increased, the hydrogen gas flow becomes turbulent, which prevents uniform dispersion of the silica powder into the oxygen-hydrogen gas mixture. Then, the silica powder is not fused uniformly and bubbles are generated inside the fused quartz glass which damages the quality of the quartz glass. For these reasons, a simple enlargement of the scale of the burner has a limit.

An objective of this invention is to manufacture a large quartz glass ingot directly by fusing silica powder without fusing a column ingot with secondary heating.

Another objective is to provide a method and an apparatus for manufacturing a round bar or desired section bar quartz glass containing a certain amount of OH continuously.

Another objective of this invention is to provide a burner for manufacturing large scale quartz glass ingots at a high productivity, effectively fusing silica powder without generating bubbles inside the ingot.

SUMMARY OF THE INVENTION

Additional features and advantages of the invention will be set forth in the description, which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, a method for manufacturing a quartz glass slab ingot comprising the steps of depositing fused silica at the center of a rotating furnace, heating the deposited fused silica and extending the silica toward the periphery of the furnace thereby obtaining a large scale slab ingot conforming to the section of the furnace.

A quartz glass slab ingot manufacturing apparatus includes a rotating furnace having a silica supply means and heating means at a ceiling of the furnace.

In another aspect of the instant invention, a method for manufacturing an elongated bar quartz glass in a flame hydrolysis reaction comprises the steps of withdrawing fused silica having a section identical with an opening of a nozzle disposed at the bottom of the furnace. When withdrawing the fused silica from the opening of the nozzle, a dummy member made of quartz glass is inserted into the opening of the nozzle, adhering the quartz glass to the dummy member, withdrawing the dummy with fused silica in the furnace downwardly, maintaining a tension while withdrawing thereby obtaining an elongated bar quartz glass ingot.

Further, the nozzle is sealed from the inside atmosphere of the furnace by placing a quartz glass plate between the upper part of the nozzle and the furnace bed, and the nozzle is projected inside the furnace for preventing the formation of bubbles at the surface of the quartz glass ingot.

The diameter of the quartz glass bar withdrawn from the furnace is controlled by the opening area of the nozzle and the opening area of the furnace brick placed under the nozzle.

To obtain a relatively high OH containing quartz glass ingot stably, the oxygen-hydrogen ratio has excess hydrogen compared with the chemical theoretical ratio for maintaining the furnace atmosphere under a reducing condition.

By adopting the oxygen-hydrogen flame method, it is possible to manufacture highly purified quartz glass having a relatively high OH content and less bubbles as compared with the one manufactured by the electric heating method, and the oxygen-hydrogen flame method comprising the steps of supplying silica powder continuously, fusing the silica powder with the clean oxygen-hydrogen flame, which prevents contamination from the heat source, and depositing the fused silica.

As the quartz glass plate is placed between the upper part of the nozzle and the bottom of the furnace for sealing the furnace, thereby preventing the air flowing into the furnace through the nozzle, an exhaustion of the furnace materials by the oxidation atmosphere and prevention of the fluctuation of the gas pressure and the furnace temperature occur, consequently stabilizing the quality of the products.

A hollow quartz glass is withdrawn continuously from the bottom of the furnace through a heat-resistant material nozzle having an opening conforming to the hollow structure of the quartz glass ingot. The heat-resistant materials for the nozzle of this invention should not chemically react with the fused quartz glass, for instance the material may be selected from platinum, tungsten, molybdenum, zirconia, carbon or boron nitride. The atmosphere of the inner furnace is kept under a reducing condition and wearing of the nozzle part which contacts with the fused silica is almost suppressed. Under these conditions, the raw materials of the nozzles for a simple configuration or low accuracy quartz glass product may be carbon. For a quartz product with an acute angle, complex configuration or with a high accuracy, a carbon material is not preferable as the raw material because the continuous operation of the furnace damages the carbon or graphite nozzle and wearing of the nozzle brings about the accuracy problems. It is preferable to use tungsten or molybdenum having a high melting temperature and much more preferable to use heat-resistant materials having a quartz glass coating.

Regardless to say, it is preferable to use highly purified materials containing low amounts of alkali metals, which damage the quality of the quartz glass with a little amount. The quartz glass plate for sealing the furnace from the outside atmosphere not only works a shutter for an oxidation atmosphere but also as heat insulation by a seft-lining effect and preventing contamination of the quartz glass product.

Further, the bottom of the furnace is a layer of aluminum bricks, and the side walls comprise silicate carbon bricks or zirconia bricks. Outside the side walls is provided a double heat insulation wall comprising porous aluminum bricks and aluminum bricks. The furnace ceiling comprises aluminum bricks, porous aluminum bricks or zirconia bricks having heat-resistant features in which a hole for the burner is formed.

As the furnace bottom is exposed to heat radiated from the burner at the top ceiling, it is preferable to apply $ZrO_2$—$SiO_2$ series zircon bricks, or heat-resistant high melting point metals, such as zirconia, tungsten or molybdenum.

However the zircon bricks react with the fused silica upon contact, like the aluminum bricks, the surface of the bricks should be covered with zirconia particles which is easily parted from the surface. Further, the furnace bottom is covered with the quartz glass plate forming a double layer structure.

Moreover, if the furnace bottom material reacts with the quartz glass, which causes devitrification, it is likely that bubbles are generated. These bubbles are so called bottom bubbles, and if many bottom bubbles are formed, they are taken into the quartz glass being withdrawn from the furnace. Consequently, the surface of the quartz glass product has open bubbles, which become craters on the quartz glass surface. To prevent this drawback, the nozzles are preferably projected to inside the furnace.

The difference between the diameter of the product and the nozzle is in inverse proportion to the area of the opening of the bricks disposed under the nozzle. It is possible to manufacture different diameter products only by changing the area of the opening while the nozzle diameter is constant. The best combination of the nozzle diameter and the opening is determined depending on the diameter of the final product.

When the fused silica is withdrawn from the nozzle hole disposed at the bottom of the furnace, a quartz glass dummy member placed at the top of the lift is inserted into the nozzle hole, then the fused silica adheres to the dummy member. Pulling the dummy member downward, fused silica is forced to go down continuously through the nozzle with the tension, the shape of the silica glass product is more accurate conforming to the shape of the nozzle hole than the conventional method, in which the fused silica flows down through the nozzle by gravity.

The product section configuration has a variety of options, for instance, not only a round section but also a plate section, a star section or another special section configuration quartz glass product is obtained. For instance, a combination of a curved section, a straight line section or an acute angle section, which are considered to be impossible by the conventional method, can be manufactured by this invention.

A coolant gas is introduced into the furnace through the bottom hole of the furnace, exhausting the inner gas from the upper gap.

A coolant gas is injected into the furnace through a coolant nozzle disposed at the bottom of the furnace The coolant gas cools the periphery of the fused silica which is cooled and solidified prior to the solidification of the center core of the fused silica just before withdrawn from the nozzle and the solidified top is forcedly withdrawn through the nozzle with the adhered dummy member. Then the solidified top part is formed into the similar form of the nozzle hole section continuously thereby the solid quartz glass is obtained.

As described above, a solid quartz glass having a desired form similar to the section of the nozzle hole is continuously and stably manufactured with high accuracy.

An exhaust gas generated by a reaction between the oxygen-hydrogen gas flame and the silica powder remains in the furnace and is discharged through an exhaust channel and the coolant gas is introduced into the furnace from the furnace bottom. Thereby, the gas flow inside the furnace stabilizes the furnace temperature and keeps the atmosphere of the furnace quite clean.

The atmosphere of the furnace should be kept at a reducing condition, the coolant gas is preferably selected from inert gases, for instance, nitrogen, argon, or helium. From the view point of preventing the furnace members from being exhausted by oxidation, a mixed gas of hydrogen and argon is a preferable coolant gas.

Further, the coolant gas is selected considering the material of the nozzle, as the coolant gas does react with the nozzle material at a very high temperature.

The coolant gas is preferably purified by filtering and the purified gas flow inside the furnace is considered to be a kind of gas curtain which prevents the invasion of impurities from the furnace materials into the quartz glass while manufacturing.

In this specification, a longitudinal quartz glass includes a round bar, a square bar, a plate, a bar having a special section, such as a star section, and further includes a cylindrical hollow bar manufactured by placing nozzles in a circle arrangement.

A burner used for this method comprising a hydrogen supply tube, oxygen supply tube and a silica powder supply tube, which is preferably a quartz glass burner from the view point of the purity of the product. The number or the capacity of the burner is determined considering the product specification, dimension of the furnace, nozzle formation and amount of the silica supplied and determining the required heat capacity conditions. A sub-burner may be installed in addition to a main burner and supplies heat to melt the deposited silica.

The burners are installed such that at the opening of the ceiling, the top of the burner projects from the ceiling.

The burner comprises a tapered outer casing, an oxygen gas chamber disposed at an enlarged portion, oxygen gas nozzles disposed at the lower end of the oxygen gas chamber and silica powder supplying nozzles disposed between the outer casing and the oxygen gas chamber. The hydrogen gas is supplied along the outer wall of the oxygen gas chamber so that the hydrogen gas flows and is dispersed uniformly and the burner is applicable for manufacturing a large scale high quality quartz glass ingot.

The silica powder supply nozzles are spaced equidistantly and arrayed concentrically along the periphery of the outer casing so that the hydrogen gas flow is not prevented by the silica powder supply nozzles as with the conventional ones, and the silica powder is supplied uniformly.

The oxygen gas nozzles are also spaced equidistantly and arrayed concentrically at the bottom of the oxygen gas chamber and a part of the hydrogen gas is introduced between the oxygen gas nozzles for mixing the two gases near the outlets of the oxygen gas nozzles for preventing the excess of the oxygen gas at the center of the burner and forming a uniform oxygen-hydrogen flame.

Further, a hydrogen gas guide plate is disposed between the oxygen gas nozzles and inner wall of the outer casing, a part of the hydrogen gas is deflected toward the center of the burner, and the hydrogen gas is led between the oxygen gas nozzles.

For the purpose of mixing the oxygen gas and the hydrogen gas, the oxygen supply tube is formed as a coaxial double tube and the hydrogen supply tube is placed in each passage of the oxygen gas tube.

A ring-form hydrogen gas chamber is connected to the hydrogen supply tube, from which the hydrogen gas is supplied to the outer casing along the outer wall of the oxygen gas chamber and the oxygen and hydrogen are mixed uniformly in the outer casing.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
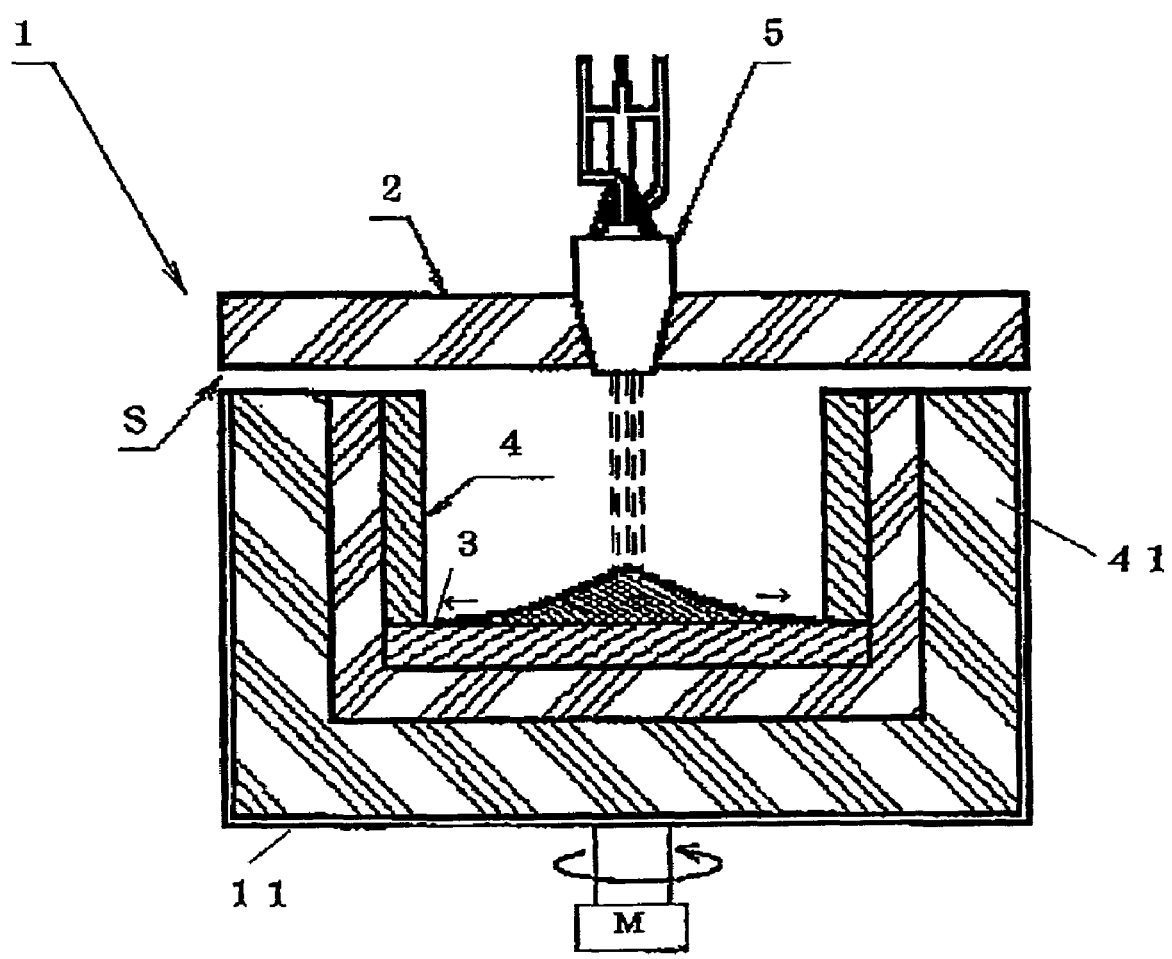
FIG. 1 shows a front view of a quartz glass manufacturing furnace of the present invention.

As shown in FIG. 1, a furnace 1 is placed on a rotatable frame 11 on which aluminum bricks are arrayed and sidewalls 4 are erected with carbon silicate bricks conforming to a shape of the manufactured quartz glass ingot. Outside the sidewalls 4, aluminum porous bricks and aluminum bricks are placed in double to form a double wall 41 for heat insulation. A top of the furnace is open to the air and a ceiling 2 is hung over the furnace 1 with a space S so that the furnace 1 can rotate independently.

The ceiling 2 consists of heat-resistant materials, such as aluminum bricks, porous bricks or zirconia bricks and has openings for installing burners and an observation window.

The materials for the furnace construction, a magnesia refractory, such as MgO bricks or Mgo-$Al_2O_3$ bricks, and a basic refractory, such as CaO are not applicable as furnace materials, because they are not durable against the high temperatures while melting the quartz glass and react with melted quartz glass very heavily.

Also, a neutral refractory, such as $Al_2O_3$ has enough heat-resistant property for quartz glass manufacturing, but it reacts with melted quartz glass heavily, it is not applicable to the members of the furnace where contacting with the melted quartz glass directly.

On the other hand, a silicon carbide refractory is a proper material for the furnace side wall because it has a high heat durable property and a high strength, and the fused quartz glass does not stick to it. Amongst the silicon carbide refractories, a silicon carbide brick made of silicon oxide or silicon nitride as a binder is preferable and silicon nitride bonded silicon carbide brick (SiC 80%, $Si_3N_4$ 20%) is more preferable.

The surfaces of the bricks used for construction of the furnace 1 are burnt at a high temperature prior to the construction for removing metal impurities remaining on its surfaces. Small particles on the brick surface act as a gas generating agent and cause a devitrification of the quartz glass, they should be completely removed before the construction by burning the surface.

A furnace bed 3 is exposed to heat radiated from the burner, the surface of the bed is preferably constructed with high heat durable $ArO2$-$SiO2$ type zircon bricks. But zircon bricks react with the fused silica strongly if it contacts directly with the fused silica like aluminum bricks, the manufacturing product may be broken or it becomes very difficult to withdraw the product from the furnace. So zirconia particles of 2 to 10 mm in diameter having good heat durability are laid slightly upon the surface of the furnace bed 3 so that the quartz glass product is easily withdrawn. As the zirconia is laid in the form of a particle, it reduces the influences of thermal expansion difference problems when heating and cooling.

Silica powder, a raw material of the quartz glass, are silica stone, silica sand, quartz powder or silica powder prepared by hydrolyzing silicon alcoxide under the existence of hydrochloric acid or ammonium as a catalyst, and sintering. Silica powder is also prepared by reacting an alkali metal silicate solution with an acid and sintering the generated silica.

Silica powder is preferably 40 to 250 mesh, more preferably 80 to 100 mesh and the supply speed is selected from 1.0 to 20 Kg/Hr depending on the specification of the product, for instance, transparent or opaque, use, and formation of the product.

When manufacturing an ingot with a special section with a better surface condition, the supply speed may be 2 to 5 Kg/Hr, considering productivity.

If the quartz glass product is opaque, silicon nitride powder is added to the silica powder as a gas-generating agent.

Figure 13:
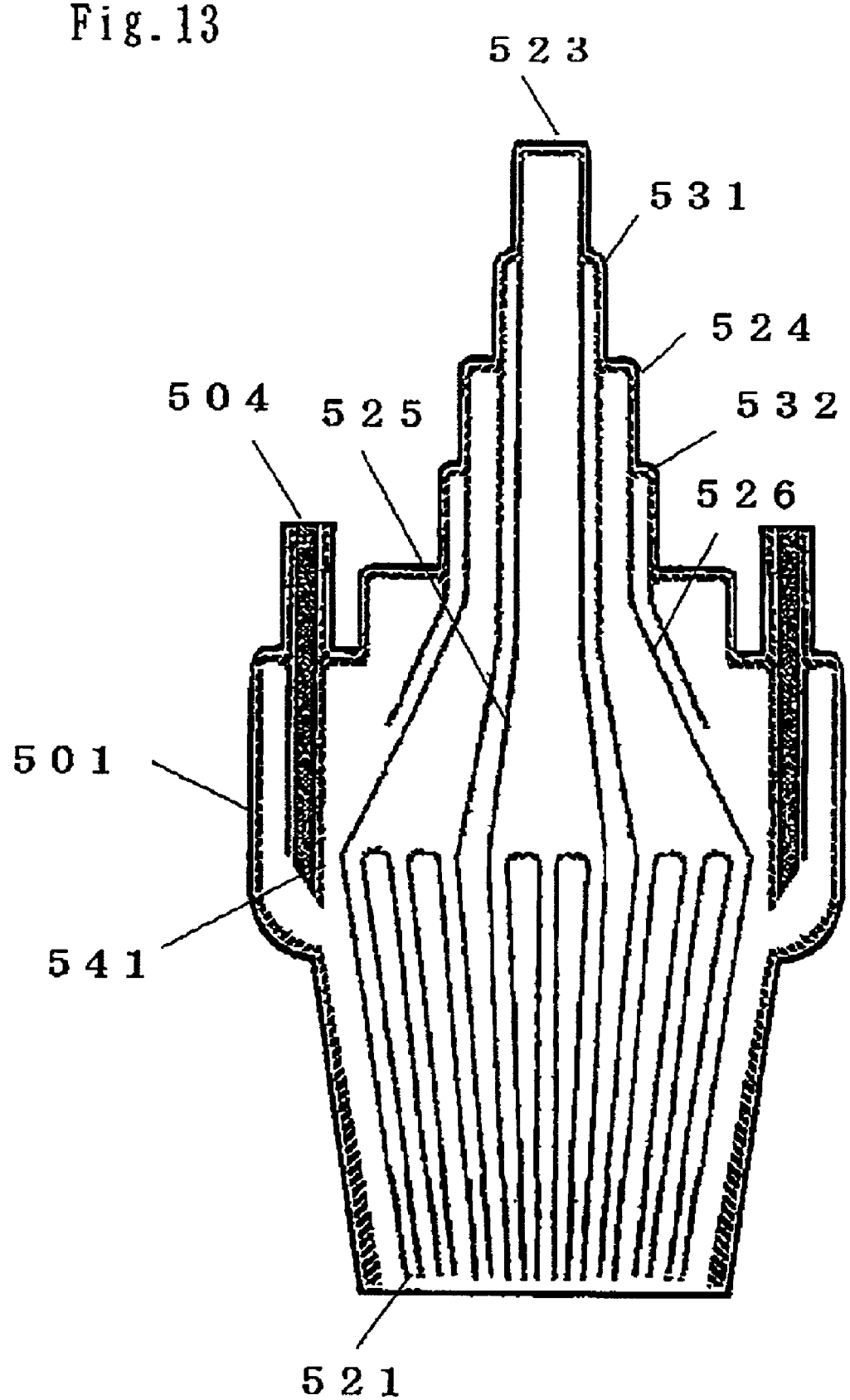
FIG. 13 shows a front sectional view of a third embodiment of the burner.
Figure 14:
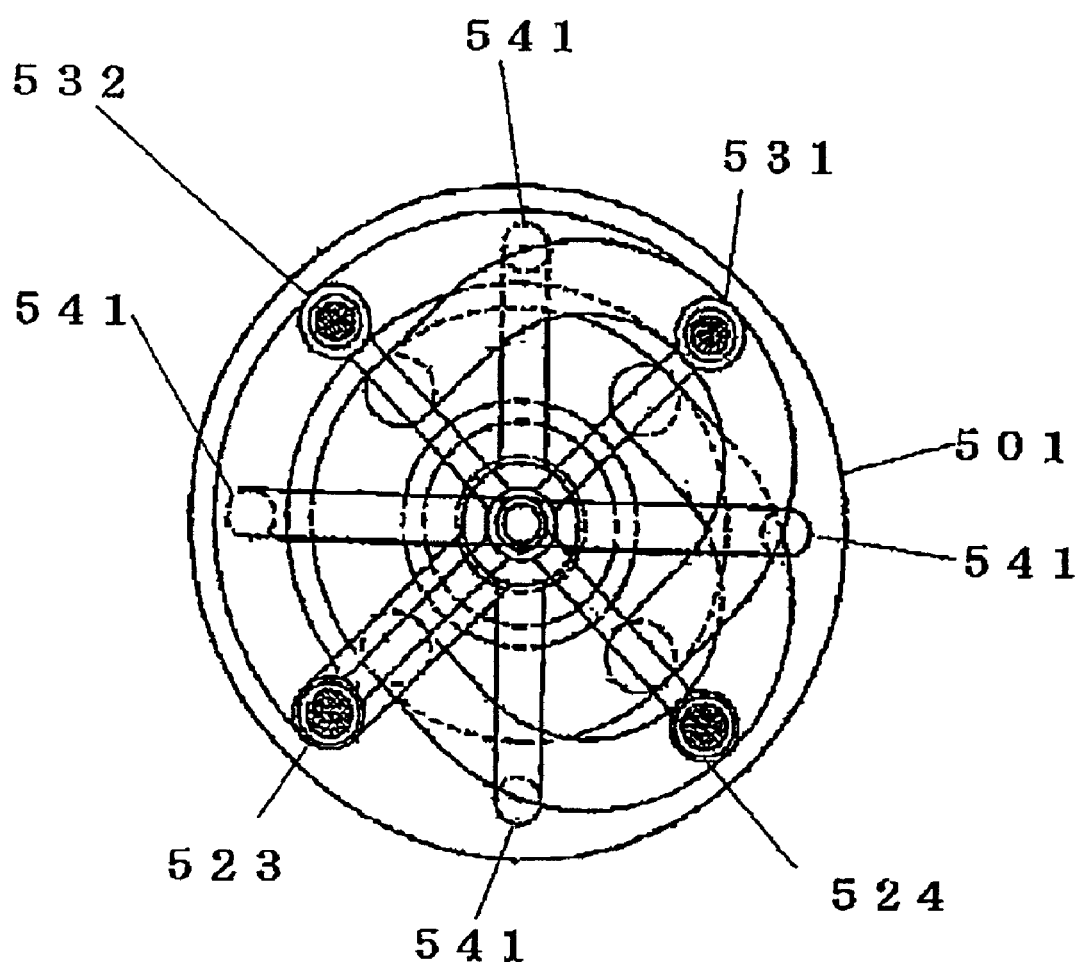
FIG. 14 shows a plane view of the third embodiment of the burner.
Figure 15:
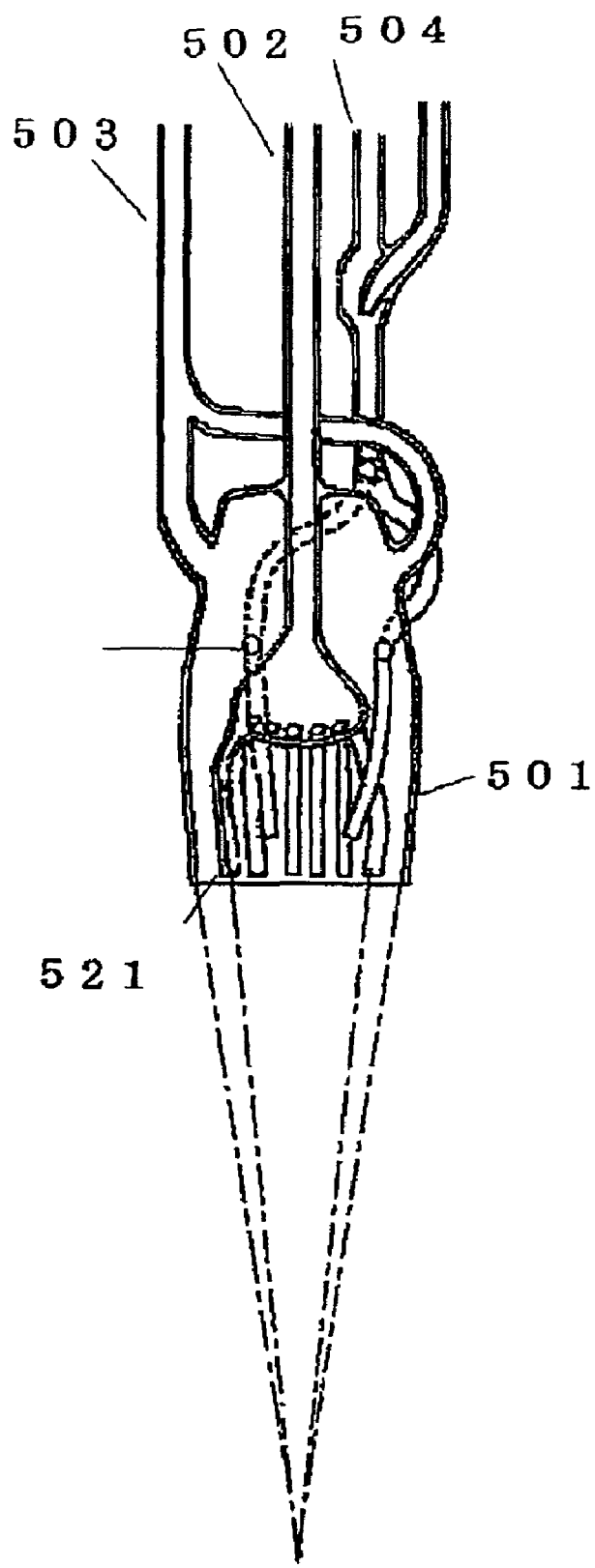
FIG. 15 shows a front view of a burner of the prior art.

A conventional quartz glass burner as shown in FIG. 15, comprising supply tubes for oxygen 502 and hydrogen 503 and a supply tube for silica powder 504 may be applicable but a burner shown in FIG. 9 to FIG. 14 is recommended as the silica powder is properly fused.

Figure 2:
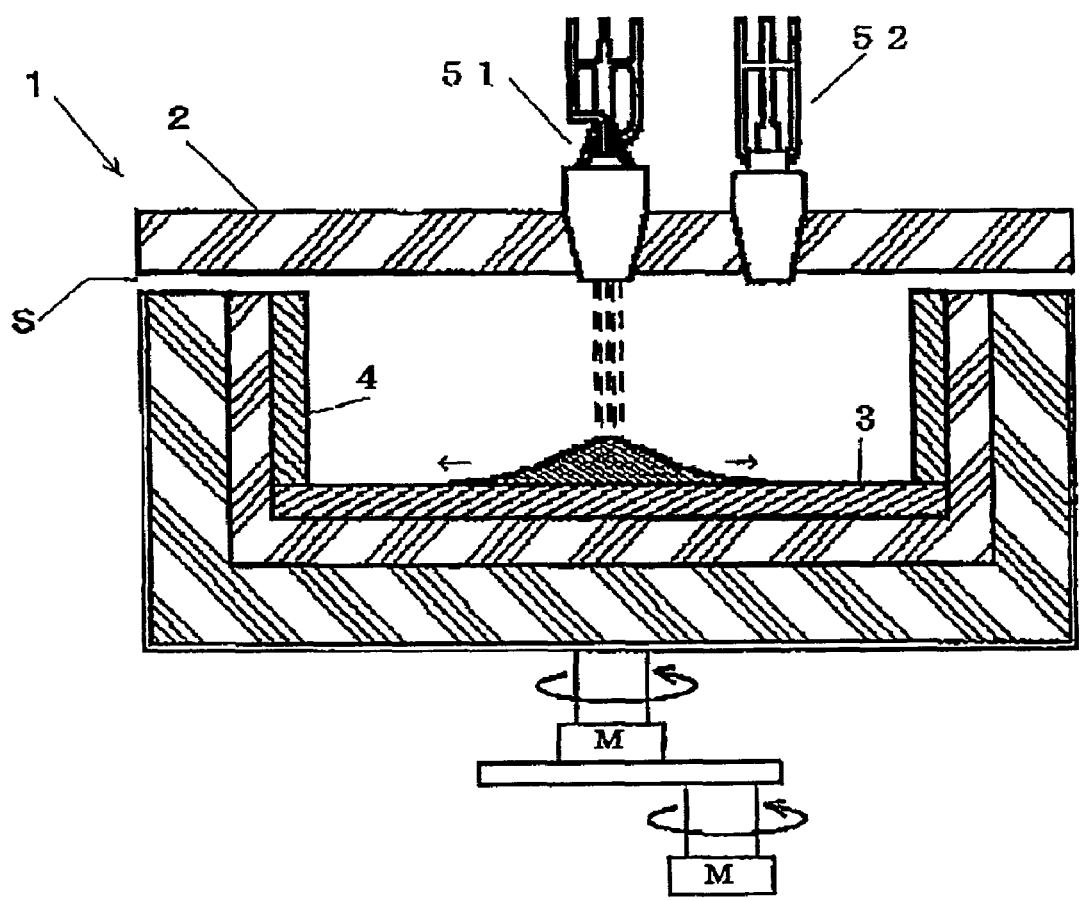
FIG. 2 shows a front view of the furnace equipped with a sub-burner.

The burner 5 is installed projecting from the ceiling 2 as shown in FIG. 1 and FIG. 2 in an opening disposed at the ceiling bricks.

As shown in FIG. 2, one or a plurality of sub-burners 52 is installed other than a main burner 51, in case the scale of the product, depending on the area of the furnace, is large and the heat supplied by the main burner 51 is not considered to be enough for fusing the large scale ingot. The sub-burner 52 supplies heat for melting the fused and deposited silica on the furnace bed 3 and extending the deposited silica outwardly, toward the side walls 4.

The flame direction of the sub-burner 52 is not only vertical but also an oblique setting is allowed for distributing the heat uniformly in the furnace. For this purpose, sub-burners 52,52 may be arranged around the main burner 51.

The sub-burner 52 is preferably inclined 5 to 15 degrees with respect to the rotation direction of the furnace for preventing a disturbance or an interference of the flame between the burners.

On the surface of the furnace bed 3, zirconia particles are laid 10 mm thick for preventing direct contact of the fused silica with the furnace bed bricks. If the fused silica contacts with the furnace bed bricks, the quartz glass may crack. The thickness of the zirconia particle layer is determined depending on the surface condition of the furnace bed 3.

The ceiling 2 is hung over the furnace 1 with the space gap S so that the ceiling is independent from the rotation of the furnace 1. The main burner 51 or sub-burners 52, if necessary, are installed in the opening disposed in ceiling bricks and a hydrogen gas and an oxygen gas supply pipes are connected to the burners 5. Silica powder supply pipe from a supply hopper (not shown) is connected to the silica supply tube 504 of the main burner 51. A vibration apparatus (not shown) is installed in the silica powder supply system for preventing blockage of the powder.

Igniting the main burner 51 and the sub-burner 52, the furnace 1 is rotated at a rate of 2 to 10 rpm. The furnace 1 is pre-heated for 1 to 3 hours prior to the operation, if necessary, for removing impurities and small debris on the furnace bricks.

The silica powder is supplied from the hopper to the main burner 51 by a powder supply system and fused in the furnace 1. The silica powder drops on the center of the furnace bed 3 from the ceiling 2, is fused by the heat from the burner and the heat capacity of the fused silica and the fused silica is deposited while flowing and extending toward the side walls 4 of the furnace 1. The center of the furnace is maintained at 2000° C., higher than the melting point of the quartz glass, by the burners 51, 52, and as the furnace 1 is rotating, the fused silica extends toward the outward of the furnace as the fused silica is deposited.

The quartz glass ingot is manufactured as the deposited fused silica flows and extends, less bubble-containing quartz glass ingot is obtained. Essentially, in the conventional flame hydrolysis method for manufacturing quartz glass ingot, silica powder is continuously dropped and fused by the heat from the burner and the heat capacity of the fused silica, less bubble-containing ingot is obtained compared with the electrical heat furnace method. But in the conventional flame hydrolysis method, if the heat capacity decreased, then the silica powder particles are not completely fused, spaces between the particles remain in the ingot and probably become bubbles in the ingot. On the other hand, according to the method of the present invention, the spaces between the particles are filled while the fused silica flows and extends outwardly, consequently, less bubble-containing quartz glass ingot is obtained.

The furnace is automatically lowered as the deposited fused silica grows and the distance between the main burner and the top of the deposited fused silica is constantly controlled. Further, the furnace may be shook laterally 50 to 150 mm to assist the smooth extension of the fused silica. As shown in FIG. 2, the furnace is driven by the two electric motors, one is for revolution and the other is for rotation, the furnace is consequently shook laterally.

The fused silica reaches the side walls 4 as the consequence of the extension movement, and an ingot conform to the section of the furnace 1 is formed. For instance, if the furnace walls are arranged as a rectangle of 100 mm×100 mm, then 300 mm thick rectangular quartz glass ingot can be obtained. If the wall bricks are arranged as polygon or circular, polygon ingot or circular ingot is obtained respectively.

When the predetermined amount of silica powder is supplied to the burner and deposited, the silica powder supply system is stopped but the heating is continued until the center top of the deposit having a shape of a mound becomes almost flat.

After extinguishing the burners, the furnace rotation is stopped and the side walls of the furnace are removed to take out the manufactured quartz glass ingot.

Before removing the side walls, the ingot may be annealed for several hours with the heat of the burners, thereby the strata of the center area of the ingot becomes thinner, and consequently the refractive index uniformity $\Delta\eta$ of the ingot is greatly improved.

Embodiment 2

Figure 3:
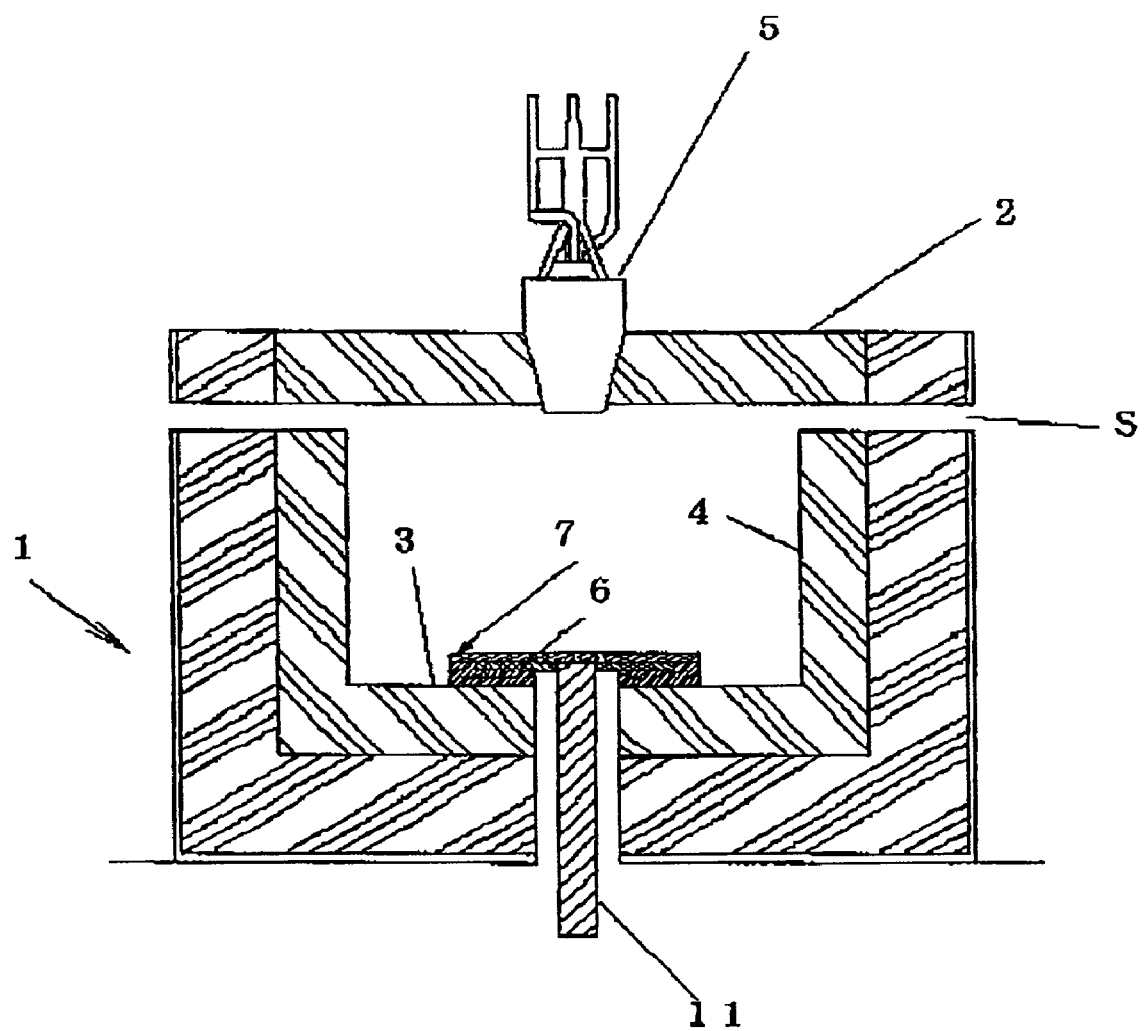
FIG. 3 shows a front view of a round bar manufacturing.
Figure 4:
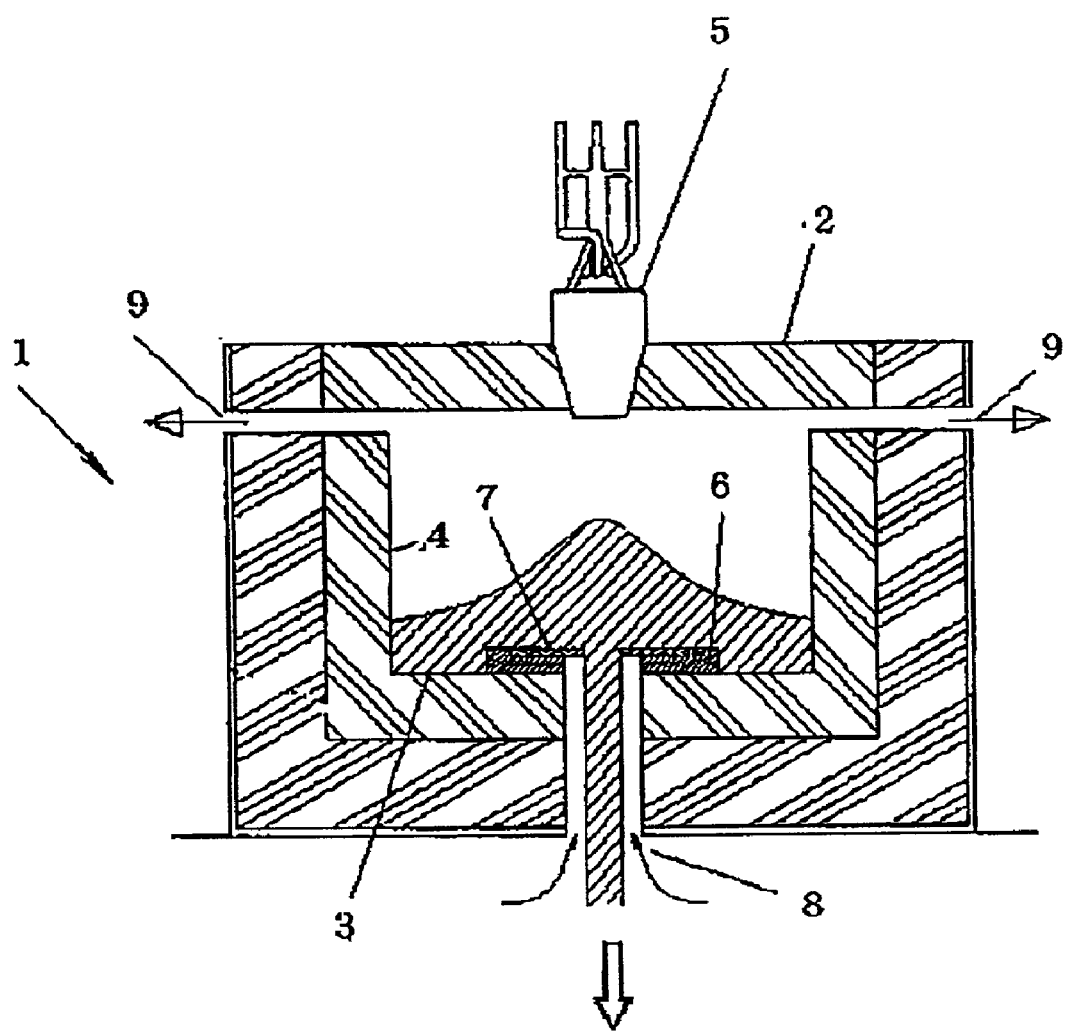
FIG. 4 shows the fused silica in the furnace of the present invention.

As shown in FIG. 3 and FIG. 4, a main burner 51 and a sub-burner 52 (not shown) are installed in openings disposed in the ceiling 2, and hydrogen and oxygen supply pipes are connected to the burners. Silica powder is supplied from the silica hopper (not shown) through the silica supply pipe. A vibrating apparatus is attached to the silica powder supply system for preventing blockage.

The furnace ceiling 2 and the furnace bed 3 consist of zirconia bricks and the side wall is of a double wall construction consisting of zirconia bricks and aluminum bricks.

A tungsten nozzle 6 is installed projecting to the inner furnace at the furnace bed 3, and under the nozzle 6, a $\phi 100$ mm opening is disposed, the diameter of the nozzle is adjusted to form a product diameter of 41 mm. A 5 mm thick quartz glass plate 7 is placed upon the nozzle 6 for closing the nozzle hole.

Igniting the main burner 51 and the sub-burner 52, preheating the furnace for 1 to 2 hours, then starting a supply of the silica powder by a silica powder supply system (not shown) to the main burner 51. The silica powder drops from the ceiling 2 to the center part of the furnace bed 3 and the fused silica deposits and extends toward the side walls. Inside, the center furnace is heated up to 2000° C., higher than the melting point of the quartz glass by the flame generated by the main burner 51 and the sub-burner 52. The ceiling is independent from the side walls, so that the furnace can be rotated and the deposit of the fused silica extends toward the side walls of the furnace.

Figure 5:
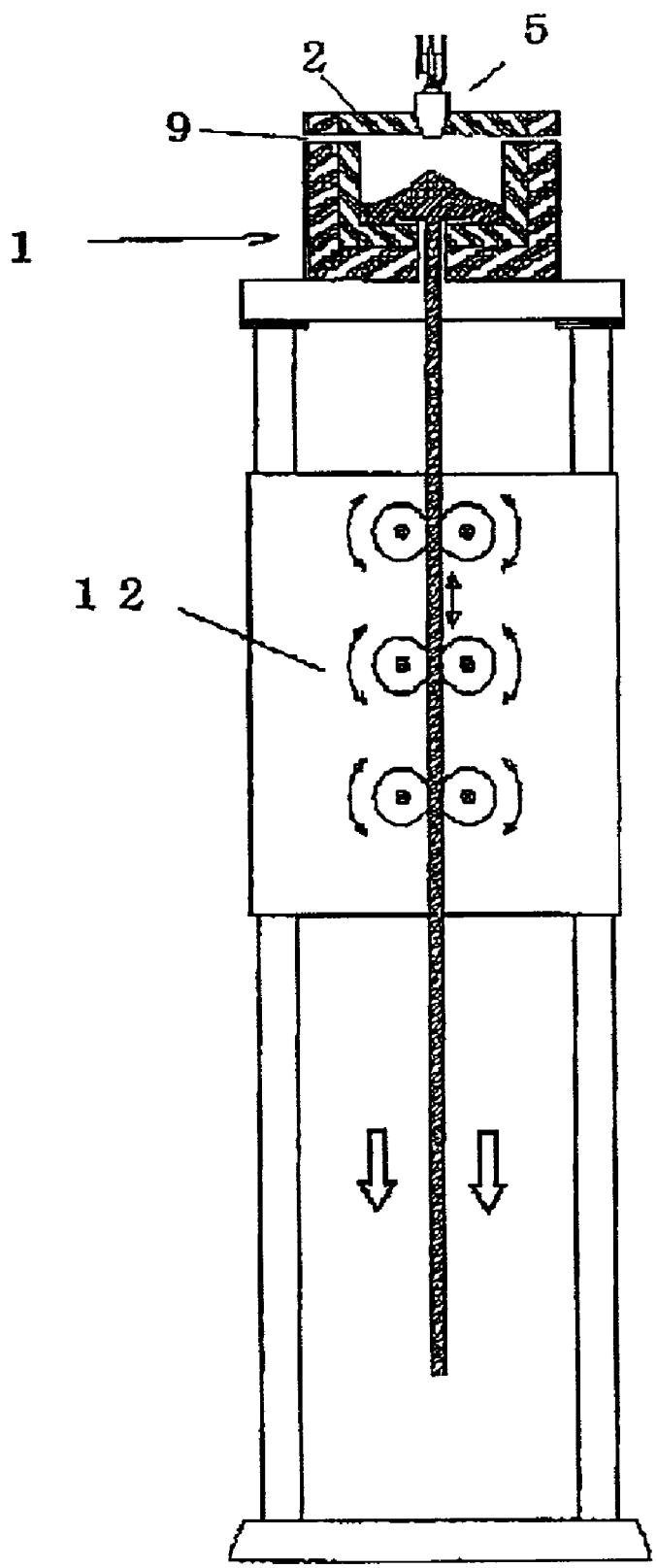
FIG. 5 shows a withdrawing apparatus and the furnace.

The quartz glass plate 7 becomes soft and starts sinking. When the sinking reaches a predetermined amount, a dummy member 11 placed at a top of the lift disposed under the furnace is inserted into the nozzle hole 6 furnace synchronizing the rotation of the furnace, the dummy member 11 is adhered to the fused silica ingot with the quartz glass plate 7, then the dummy member 11 is lowered to withdraw the quartz glass ingot through the ingot generating a tension within the ingot. As shown in FIG. 5, a withdrawn quartz glass bar is lowered with tension, being guided by the stabilizing rollers 12, cut at a predetermined length by a cutter (not shown) and stored.

At this moment, as shown in FIG. 4, hydrogen gas is introduced into the furnace via a coolant nozzle 8 and discharged through an exit 9 thereby adjusting the viscosity of the fused quartz glass at the bottom of the furnace for stabilizing continuous withdrawal of the quartz glass bar.

When the predetermined amount of the silica powder is supplied, the supply system is stopped and the burner is extinguished by stopping the supply of hydrogen and oxygen. 600 Kg of silica powder is supplied, a 41 mm$\phi$ solid round bar of 163 m long, 496 Kg weight is manufactured for 508 hours operation. The deviation of the diameter of the round bar product is only 1 mm for a high accuracy.

Embodiment 3

Figure 6:
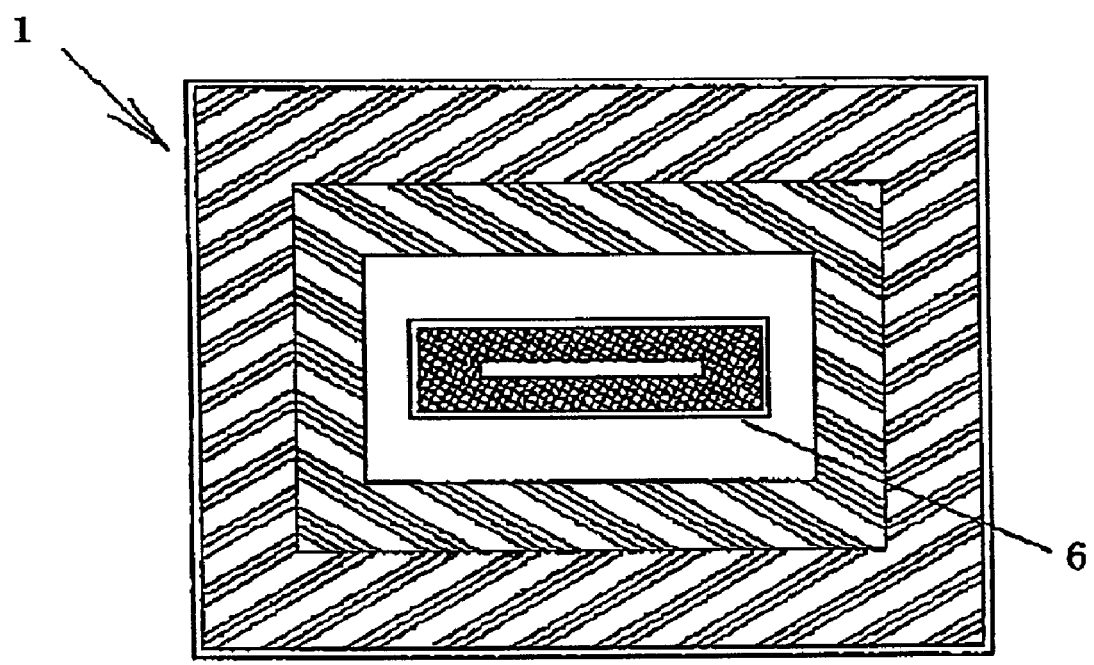
FIG. 6 shows a bottom of a furnace for producing plate quartz glass.

As shown in FIG. 6, a plane view of the furnace 1, the size of the tungsten nozzle 6 is 200 (mm)×8 (mm), sectional area of the furnace is 460 mm×230 mm, the coolant gas is hydrogen, and the furnace and the lift are not rotated and other conditions are same as the embodiment 3.

With the supply of 320 Kg silica powder, a 200 mm×7 mm section quartz glass plate of 102 m long and 292 Kg weight is obtained for 255 hours operation.

The deviation of the thickness and side length of the quartz glass plate product is within 1 mm per 1000 mm withdrawal of the product.

Embodiment 4

Figure 7:
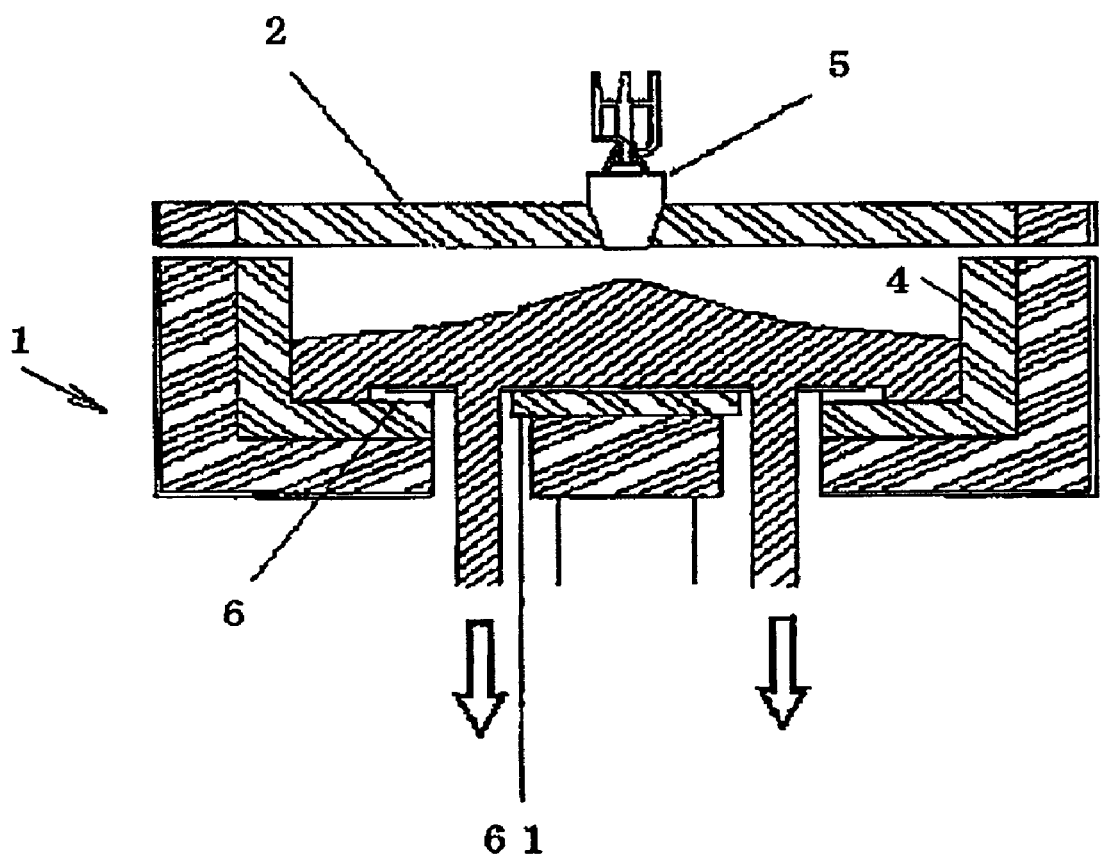
FIG. 7 shows a sectional view of an apparatus for manufacturing a cylinder quartz glass.
Figure 8:
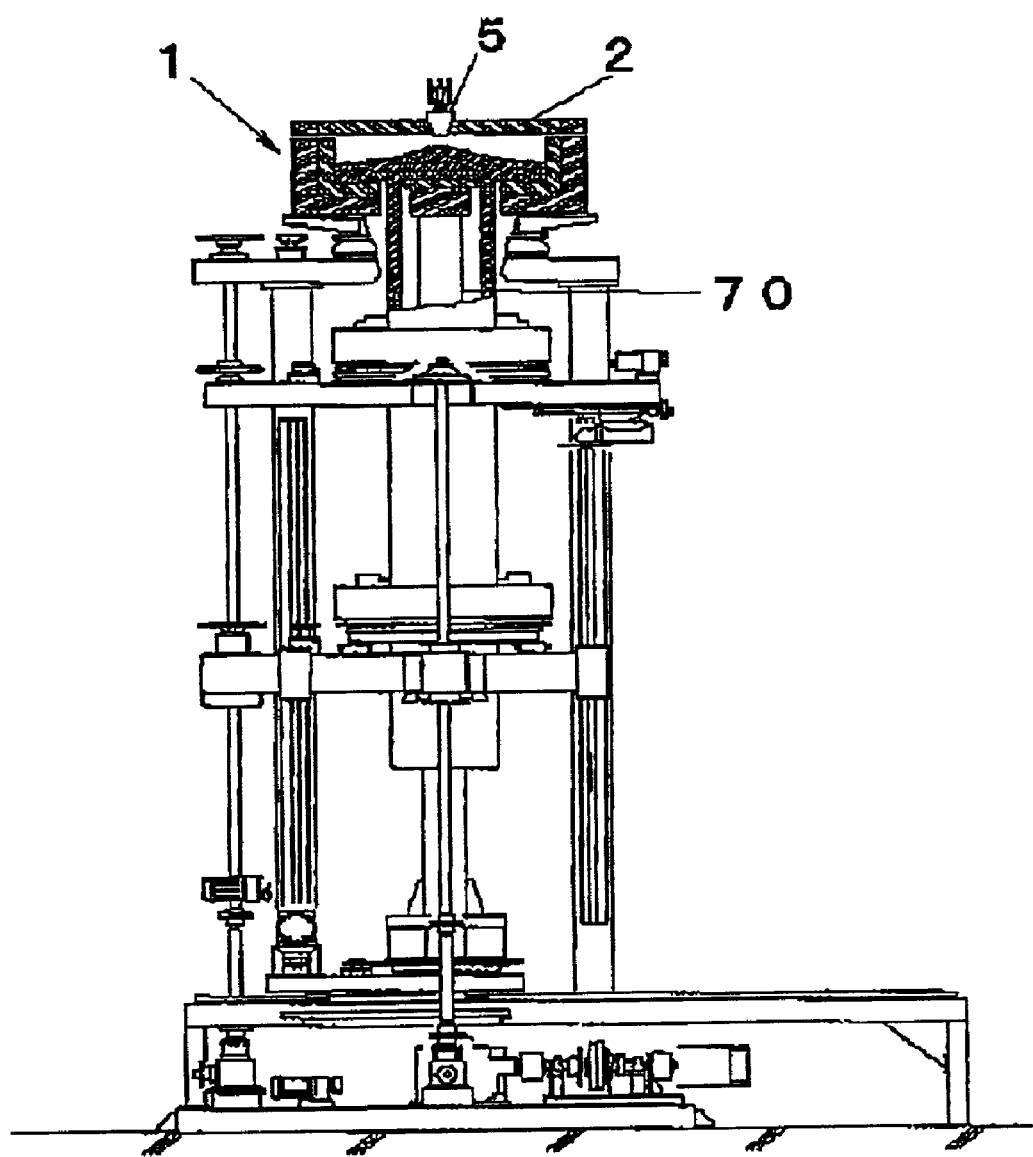
FIG. 8 shows a front view of the apparatus for manufacturing a cylinder quartz glass and a withdrawing apparatus.

As shown in FIG. 7 and FIG. 8, an inner nozzle 61 is installed inside the nozzle 6 for a purpose of manufacturing a hollow cylinder quartz glass. The inner nozzle is supported from underneath the furnace for settling the inner nozzle 61 at the center of the nozzle hole. It is preferable to adopt an electric motor rather than a hydraulic or air driven means for the lift, because the heat from the furnace influences the operation. The outer nozzle 6 is made of zirconia, and a zirconia member disposed at the top of the support means 70 is placed at the center of the nozzle hole to form the inner nozzle 61. The fused silica in the furnace is withdrawn between the outer nozzle and the inner nozzle to form a cylinder quartz glass.

The coolant gas for cooling the quartz glass is nitrogen gas. While withdrawing the quartz glass by chucking the quartz glass with a scroll chuck, the furnace 1 is rotated and the dummy member at the top of the lift and the inner nozzle 61 supported by the support means 70 are rotated synchronizing the furnace rotation. To reduce the load bearing on the support means 70 and to maintain the rigidity of the product, when the predetermined length of the cylinder quartz is withdrawn, the support means 70 is lowered to take out the product, then the support means 70 is moved upward to support the cylindrical product for the next withdrawal.

Instead of up and down operation of the support means 70, a telescopic means for supporting the inner nozzle 61 may be adopted. The inner nozzle 61 is detachably installed at the top of the support means, a different hollow section ingot can be obtained by changing the shape of the inner nozzle member.

As a result of a long time operation, two cylinder quartz glass ingots (φ525 mm×φ435 mm×1500 mm) are obtained.

Following is a detailed explanation of the burner adaptable to the method of this invention.

BURNER EXAMPLE 1

Figure 9:
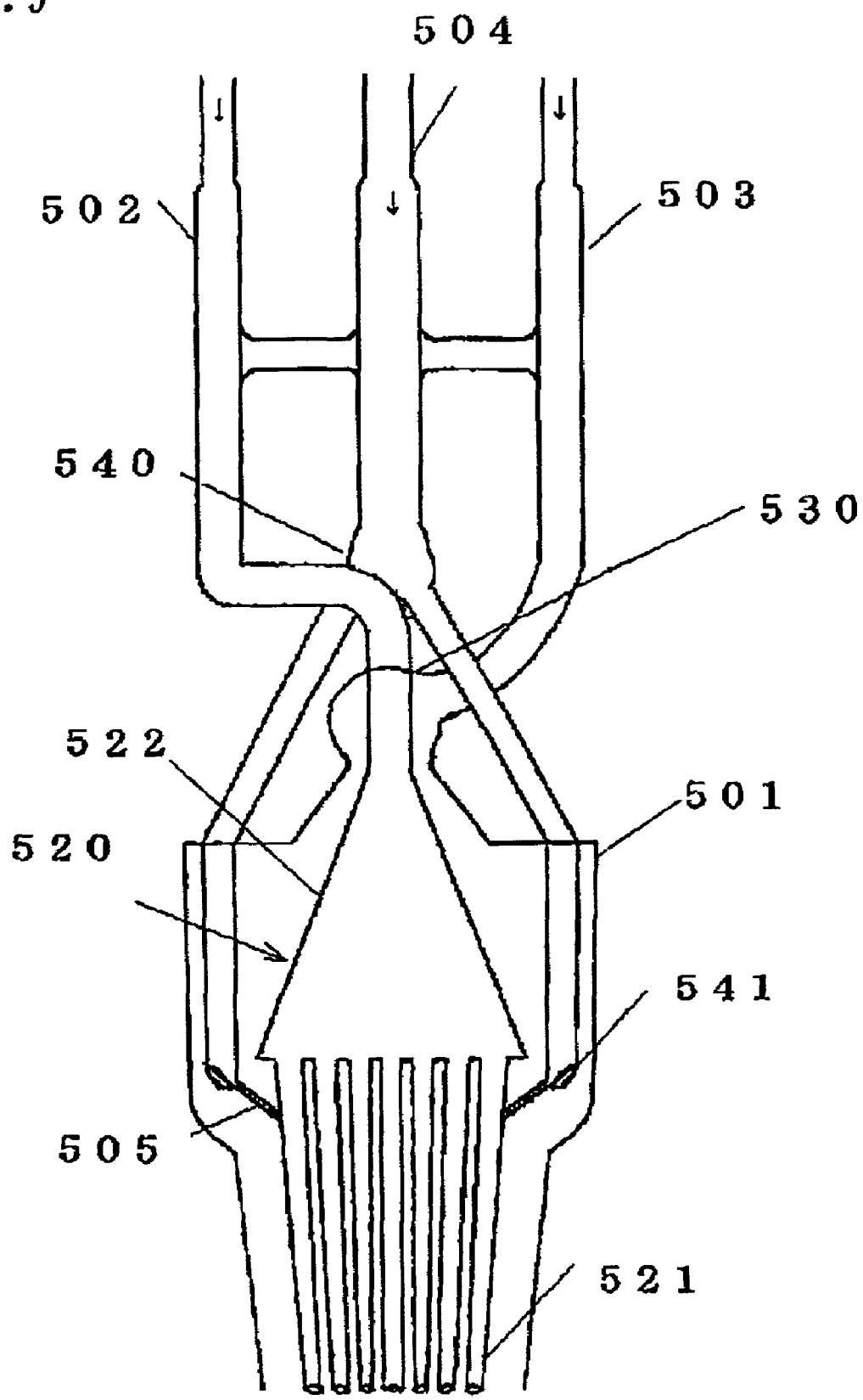
FIG. 9 shows a front view of a first embodiment of a burner.

As shown in FIG. 9, a burner made of quartz glass comprises an outer casing 501 in which a tapered oxygen gas chamber 520 is disposed, a hydrogen supply tube 503, an oxygen supply tube 502, a silica powder supply tube 504, and oxygen gas nozzles 521 disposed at the lower end of the oxygen gas chamber 520.

Figure 11:
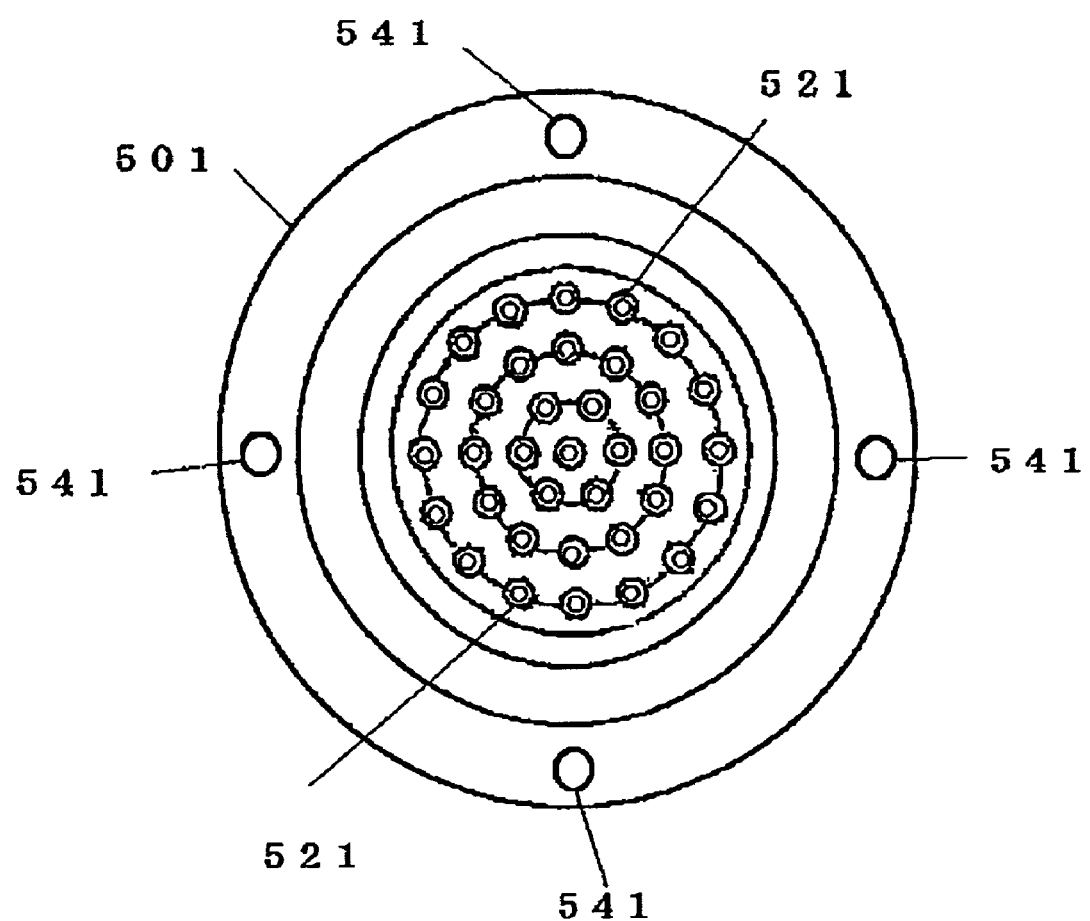
FIG. 11 shows a bottom view of the burner.

Tubes 502-504 are tied with reinforcement bars for providing a rigidity. The oxygen gas supply tube 502 is connected to the tapered oxygen chamber 520, the edge of the oxygen gas chamber 520 extends to a middle of the outer casing 501, and as shown in FIG. 11, the oxygen gas nozzles 521 are spaced equidistantly and arrayed concentrically at the bottom of the oxygen gas chamber 520 and the oxygen gas nozzles 521 extend to the edge of the outer casing 501.

The hydrogen gas supply tube 503 is connected to a ring chamber 530 from which distributing pipes extend and the supplied hydrogen gas is distributed to the oxygen gas nozzles 521 along the outer wall of the oxygen gas chamber 520.

Figure 10:
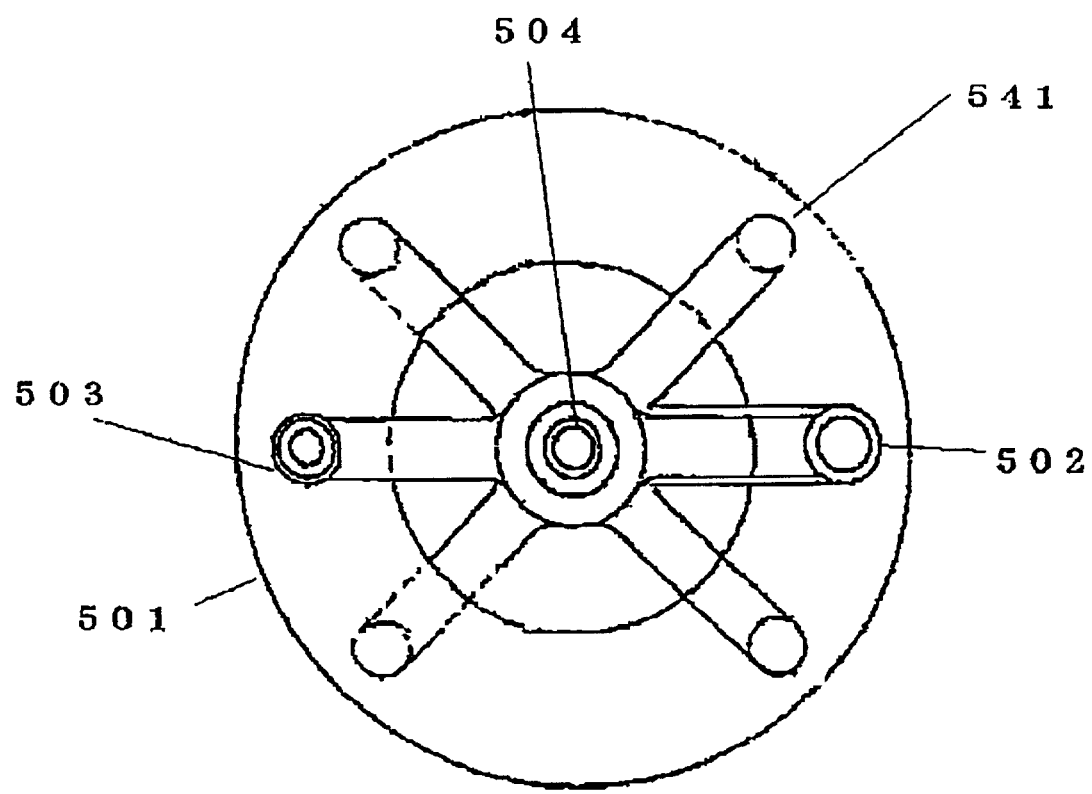
FIG. 10 shows a plane view of the burner.

The silica powder supply tube 504 is connected to a ring chamber 540 like the hydrogen supply tube, and as shown in FIG. 10, four distributing pipes are connected to silica powder nozzles 541 which are equidistantly arrayed on a circle inside the outer casing 501. The edges of the silica powder nozzles extend to a middle of the outer casing 501, and further, a hydrogen gas guide plate 505 is disposed between the most outer oxygen gas nozzle 521 and the silica powder nozzle and is inclined to the center of the outer casing 501 for guiding the hydrogen gas toward the center of the burner.

The oxygen gas is introduced into the tapered oxygen gas chamber 520 from the oxygen gas supply tube 502, so the velocity of the oxygen gas flow decreases smoothly, the oxygen gas pressure is maintained at the same level, consequently, the oxygen gas is injected constantly and stably from the oxygen gas nozzles 521 which are arranged concentrically.

The hydrogen gas is introduced into the ring chamber 530 from the hydrogen gas supply tube 503, being divided uniformly, colliding against the inclined wall 522 of the oxygen gas chamber 520, flowing downward toward the periphery of the outer casing along the wall 522 while reducing the velocity smoothly.

A part of the hydrogen gas flowing down the inclined wall 522 is deflected by the hydrogen gas guide 505 toward the center of the burner, flowing down between the oxygen gas nozzles 521 and being ejected into the air from the edge of the outer casing 501.

The silica powder, raw material of the quartz glass ingot, is supplied through the silica supply tube 504 to the ring chamber 540, being distributed uniformly toward the periphery of the outer casing 501, ejected through the silica powder nozzles 541 at the middle of the outer casing 501, and carried by the hydrogen gas flow toward the oxygen gas nozzles. A top edge of the silica powder nozzle is cut obliquely toward the periphery of the outer casing for securing a uniform flow of the silica powder along the outer casing 501.

As described above, a part of the hydrogen gas deflected toward the center of the burner is mixed with the oxygen just after the ejection from the oxygen gas nozzles, an oxygen-hydrogen flame is formed near the oxygen gas nozzles.

The hydrogen gas ejected from the periphery of the outer casing 501 is also mixed with the oxygen gas ejected from the oxygen nozzles and an oxygen-hydrogen flame is formed. Therefore, the burner of this invention is a combination of an outer mixing system and an inner mixing system, the width of the flame becomes wider than conventional burners, the thermal energy loss is reduced, and the heating area becomes larger, consequently, the thermal efficiency of the burner is greatly improved.

BURNER EXAMPLE 2

Figure 12:
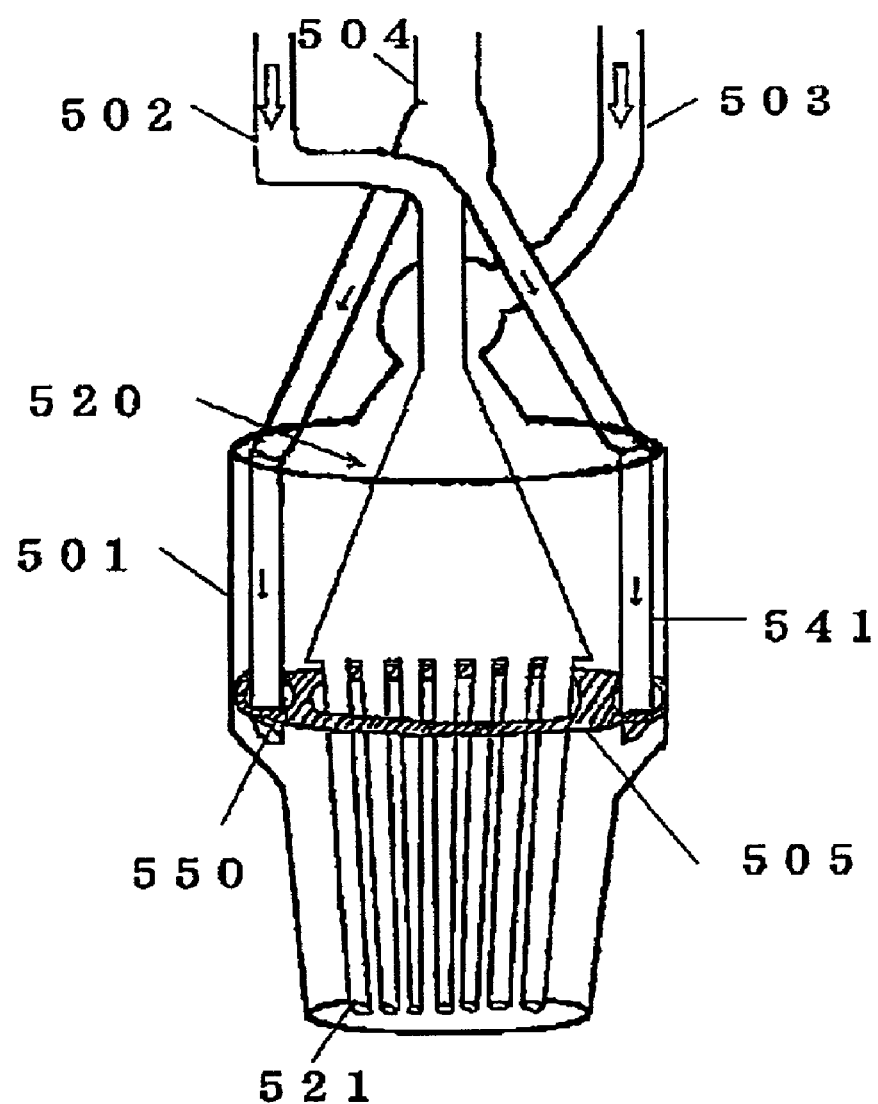
FIG. 12 shows a bird-eye view of a second embodiment of the burner.

As shown in FIG. 12, the basic configuration of the burner is the same as embodiment 1. The hydrogen gas guide 505 is extended to the periphery of the outer casing 501 so the hydrogen gas is introduced to a space between the silica powder nozzle 541 and the outer casing 501. There is provided holes 550 in the hydrogen gas guide 505, the hydrogen gas, through which the silica powder nozzles 541 extend below the hydrogen gas guide 505. The hole 550 diameter is larger than a silica powder nozzle diameter, a gap is formed therebetween. The hydrogen gas flows downward through the gaps forming a hydrogen envelope encapsulating the oxygen gas nozzles 521 and the oxygen-hydrogen flame is generated.

Also, a part of the hydrogen gas deflected toward the center of the burner is mixed with the oxygen just after the ejection from the oxygen gas nozzles, an oxygen-hydrogen flame is formed near the oxygen gas nozzles.

BURNER EXAMPLE 3

As shown in FIG. 13 and FIG. 14, the oxygen gas supply tube and the hydrogen gas supply tube are double wall structures. At each lower end of an inner oxygen gas supply tube 523 and an outer oxygen gas supply tube 524, there is provided a tapered oxygen gas chamber 525, 526 respectively, so the oxygen gas velocity flowing into the oxygen gas chamber is reduced like the burners of embodiment 1 and embodiment 2 and ejected from the oxygen gas nozzles disposed beneath the oxygen chambers.

The silica powder from the silica supply tube 504 is divided into four via ring chamber 540 and is ejected uniformly into the outer casing 501 from the silica nozzles 541.

The hydrogen gas supplied from the outer hydrogen supply tube 532 flows downward along the tapered wall of the outer oxygen gas chamber 526 to the periphery of the outer casing 501 and the silica ejected from the silica powder nozzle 541 is mixed with the hydrogen gas and dispersed in the hydrogen gas flow. The hydrogen gas is also supplied from the inner hydrogen supply tube 531 disposed between the inner oxygen supply tube 523 and the outer oxygen supply tube 524 and it flows down along the tapered wall of the inner oxygen gas chamber 525, is introduced into gaps between the oxygen gas nozzles and finally ejected.

In the oxygen-hydrogen flame method, it is preferable to have in the mixture, a hydrogen excess condition as compared with the theoretical chemical ratio, because the manufactured quartz glass temperature is maintained so that the quartz glass melting is improved. The atmosphere of the furnace becomes reducing so that the exhaustion of the furnace material by oxidation is prevented. Therefore, the Hydrogen gas/Oxygen gas ratio may be preferably within a range of 2.1 to 2.5, more preferably 2.2 to 2.4.

PRODUCTION EXAMPLE 1

In the burner of embodiment 1, the oxygen gas nozzle diameter is φ6 mm, and the number of nozzles is 35. Silica powder is used as a raw material and the Hydrogen gas/Oxygen gas ratio in moles is 2.3. The fused silica is deposited by the burner on a rotating target and the target lowered with a constant speed while rotating and a column ingot of φ480 mm×900 mm is obtained.

PRODUCTION EXAMPLE 2

The burner of embodiment 2 is adapted as a main burner. The fused silica is deposited in a rotating container and the deposit further heated with a sub-burner using a Hydrogen gas/Oxygen gas ratio, in moles of 2.3, thereby extending the deposit toward the wall of the container and a slab ingot of 950 mm×950 mm×400 is obtained.

The quartz glass ingots manufactured by production examples 1 and 2 have no collective bubbles or a crown bubble, which makes the cup area of the ingot top opaque, as observed, and as a result of the quality test, the strata or other features are the same as or superior to the quartz glass manufactured using the conventional burners.

The drawbacks of the conventional burners, that is, a blackish zone in the fusion spot, a bad fusion area, are all solved by the burner of this invention and the hydrogen gas can be uniformly supplied to the center of the burner.

Further, the thermal efficiency of the burner is improved, the mean raw material supply rate can be increased, which is considered to be 1.0 to 10 Kg/Hr, depending on the use, and the scale of the quartz glass ingot. With the use of the improved burner of this invention, the raw material supply rate of 2.0 Kg/Hr is raised to 4.0 Kg/Hr. Therefore, by a large scale slab quartz glass ingot can be manufactured at a high productivity.

What is claimed is:

1. A method of manufacturing a quartz glass slab ingot comprising the steps of:
   providing a rotatable furnace having a feeder at a top portion thereof and a burner;
   feeding silica powder to the rotatable furnace such that the silica powder drops around the center of a furnace bed in the rotatable furnace through the feeder;
   fusing the silica powder in the rotatable furnace;
   depositing the fused silica at the center of the furnace bed; and
   extending the fused silica deposit outwardly from the center of the furnace bed by heating and rotating the furnace, wherein gas supplied to the burner has a hydrogen/oxygen gas ratio of from 2.1 to 2.5.

2. The method of claim 1, additionally comprising the step of depositing zirconia particles having a diameter of 2 to 10 nm on the surface of the furnace bed prior to dropping the silica powder onto the furnace bed.

3. The method of claim 1, wherein silica powder is fed to the furnace at a rate of from 1.0 to 10 kg/hr.

4. The method of claim 1, wherein the silica powder drops solely around the center of the furnace bed.

5. The method of claim 1, wherein the burner comprises a hydrogen supply tube, an oxygen supply tube and a silica powder supply tube.

* * * * *